US009682739B2

(12) United States Patent
Anderson et al.

(10) Patent No.: US 9,682,739 B2
(45) Date of Patent: Jun. 20, 2017

(54) BLOW MOLDED TOY CYCLE (71) Applicants: Jeffrey Scott Anderson, Clinton, IA (US); Andrew James McDonnough, Camanche, IA (US); Pamela Jo Naeve, Clinton, IA (US); Duane David Franzen, Jr., Cordova, IL (US); Alan Walter Knapper, McCausland, IA (US); Michael Grinnall, Clinton, IA (US)

(72) Inventors: Jeffrey Scott Anderson, Clinton, IA (US); Andrew James McDonnough, Camanche, IA (US); Pamela Jo Naeve, Clinton, IA (US); Duane David Franzen, Jr., Cordova, IL (US); Alan Walter Knapper, McCausland, IA (US); Michael Grinnall, Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 412 days.

(21) Appl. No.: 14/189,749

(22) Filed: Feb. 25, 2014

(65) Prior Publication Data
US 2014/0312591 A1 Oct. 23, 2014

Related U.S. Application Data (60) Provisional application No. 61/813,974, filed on Apr. 19, 2013.

(51) Int. Cl.
*B62M 1/00* (2010.01)
*B62K 9/02* (2006.01)
(52) U.S. Cl.
CPC ............ *B62K 9/02* (2013.01); *Y10T 74/2168* (2015.01)

(58) Field of Classification Search
CPC .............. B62K 9/02; B62M 3/08; B62M 3/00
(Continued)

(56) References Cited

U.S. PATENT DOCUMENTS 3,807,255 A * 4/1974 Baginski .................. B62M 3/08
359/521
3,811,339 A * 5/1974 Konzorr .................. B62M 3/08
74/563

(Continued)

OTHER PUBLICATIONS

BIGWHEEL® Assembly Instructions—Undated—4 pages.
The Original Big Wheel®—Advertising Literature—Undated—2 pages.

*Primary Examiner* — Joseph Rocca
*Assistant Examiner* — Conan Duda
(74) *Attorney, Agent, or Firm* — St. Onge Steward Johnston and Reens (57) ABSTRACT

A blow molded toy cycle has a female bearing area with tapered and recess sections. A fork has a corresponding male bearing area that includes a tapered section and an annular protrusion section. A protrusion spaced at a distance from the annular protrusion extends from the shaft and has a surface to contact a top surface of the body to secure the fork when the male and female bearing areas are in contact. The fork has integrally formed tabs that to bend around an axle to form a bearing area for the axle that allows the axle to rotate within the fork. A blow molded pedal attaches to a section of the axle and has a series of ribs disposed between side sections to form a bearing area that allows the pedal to rotate around the axle. Two rear and one front wheels attach to the body and fork respectively.

22 Claims, 11 Drawing Sheets

(58) Field of Classification Search
USPC ........................................................ 280/259
See application file for complete search history.

(56) References Cited

U.S. PATENT DOCUMENTS

| | | | | |
|---|---|---|---|---|
| 3,827,719 A * | 8/1974 | Lohr | ........................ | B62K 5/00 280/259 |
| 4,079,957 A * | 3/1978 | Blease | ................... | B62K 13/00 280/278 |
| 4,596,398 A * | 6/1986 | Grossi | ...................... | B62K 9/02 280/282 |
| 4,865,337 A * | 9/1989 | Disler | ................... | A63H 17/262 280/278 |
| 5,503,411 A * | 4/1996 | Sundberg | ................. | B62K 9/02 280/1.188 |
| 5,553,878 A * | 9/1996 | Davignon | ................ | B62K 9/00 280/229 |
| 5,553,879 A * | 9/1996 | Niemeyer | ................ | B62K 9/00 280/229 |
| 6,089,586 A * | 7/2000 | Rudell | ................... | B62K 3/002 280/282 |
| 6,161,847 A * | 12/2000 | Howell | ................... | B62K 9/02 280/282 |
| 6,708,998 B1 * | 3/2004 | Blake | ....................... | B62M 3/00 280/259 |
| 7,951,049 B2 * | 5/2011 | Mondello | ............. | A63B 69/16 280/221 |
| 8,915,791 B2 * | 12/2014 | Gibson | .................. | A63G 13/06 280/1.23 |
| 2002/0047245 A1 * | 4/2002 | Greene, Jr. | ............ | B62K 3/005 280/259 |
| 2002/0152837 A1 * | 10/2002 | Oliveira | ................... | B62K 9/02 74/594.4 |
| 2004/0164515 A1 * | 8/2004 | Gunter | ..................... | B62K 9/02 280/293 |
| 2007/0052199 A1 * | 3/2007 | Schulte | ................. | B62K 13/04 280/259 |
| 2010/0308561 A1 * | 12/2010 | Diekman | ............ | B62K 15/006 280/638 |
| 2011/0088508 A1 * | 4/2011 | Chen | ....................... | B62M 3/08 74/594.6 |
| 2011/0198822 A1 * | 8/2011 | Jessie, Jr. | ................. | B62K 9/00 280/278 |

* cited by examiner

BLOW MOLDED TOY CYCLE

FIELD OF THE INVENTION

The invention relates to toy cycles and more particularly blow molded toy tricycles.

BACKGROUND OF THE INVENTION

A toy tricycle is well known in the art, however these known tricycles suffer from a number of disadvantages that can have an effect on the assembly, durability, performance and ease of use of the toy tricycle.

The known toy tricycles of the type with a large front wheel and two smaller back wheels are molded from plastic parts and assembled by the end user, or typically the parent of the end user. As with many children's toys, including toy tricycles, assembly can be a difficult or overly complicated. Often, there are numerous small parts that can be lost during assembly or unpacking. Further, during manufacture, each part must be properly accounted for so that the end user can fully assemble the toy. Because there may be a number of small parts associated with the toy, each part may need a separate manufacturing line or machine to produce the required parts. Further, in some cases, not all of the parts associated with a given toy will be manufactured at the same site, and may be outsourced to different manufacturers. This leads to added sourcing complexities and packaging issues.

For example, prior art toy tricycles may use blow molded parts to make up the large portions of the toy, and then use injection molding machines to create the smaller parts. This requires multiple molds and multiple machines to produce all the parts necessary to create a working and user assembled toy. In some cases, the manufacturing plant that does the blow molding may not also handle injection molding, and typically neither plant will manufacture the metal parts for the tricycle. This creates supply chain issues that require coordination from multiple suppliers since each part must be accounted for during packaging. Further, some of the injection molded parts may be intended to be the same color as the blow molded parts, however the properties and manufacturing techniques associated with the two parts are different, which results in the possibility of differing colors or differing shades of colors, which can have an impact on the aesthetic quality of the end product. The elimination of one supplier or even one part from the supply chain can greatly reduce manufacturing and related supply chain costs, however prior art tricycles have not successfully reduced the need for small parts.

In addition to a complicated scenario associated with manufacturing and sourcing all the parts for the toy, the prior art toy cycles can be counter-intuitive or difficult to assemble. Furthermore, small parts can be easily lost. Even though directions and warnings are conspicuously noted on the assembly instructions of most toys, individuals assembling the toy may disregard the instructions and warnings. This creates a problem of incorrect assembly that can result in an unsafe assembly or less than optimal performance of the end product, which in turn reduces consumer satisfaction with the product. The difficulty with many prior art toy tricycles is that there is more than one way to assemble the toy if not reading and following the directions, but in reality only one is correct and according to the design of the toy.

Prior art toy cycles also may not have sufficient durability to stand up to the repeated use over time. Improved durability reduces the likelihood of failure of the toy cycle due to abuse. As one example, the interface of the fork and the body of is subject to wear associated with turning the handlebar and therefore the fork. This wear is exacerbated by the weight of the rider, and eventually there will be play or wobble associated with the interface between body and fork. This wobble can cause increased bending stress on the shaft of the fork, which in turn can cause failure or buckling of the shaft wall in a dangerous manner.

It is therefore an object of the invention to provide a toy cycle having improved wear characteristics.

Another object is to provide a toy cycle having an improved assembly along with modified parts of that toy cycle that aid in the improved assembly that results in a more durable and less complicated toy cycle.

Another object is to provide a toy cycle an improved design that reduces the likelihood of incorrect assembly.

Yet another object of the present invention to reduce the total number of separate parts needed to create a toy cycle.

A further object of the present invention is to manufacture more of the plastic parts through blow molding.

It is yet another object of the present invention to provide a toy cycle having improved strength and durability.

SUMMARY OF THE INVENTION

These and other objects are achieved by providing a blow molded toy cycle with a body having a seating surface 1000 and an arm 1001. The arm has a hole 1002 with a first axis 1010, the hole defining a female bearing area 404 with a first tapered section 44 and a first recess section 40. A fork 2 has a shaft portion 1003 at a proximal end 1005, the shaft portion having a second axis 1012 passing through a center of the shaft portion. A male bearing area 1004 is located on the shaft portion, the male bearing area has a second tapered section 2010 and an annular protrusion section 2012. At least one protrusion 2008 is spaced at a distance from the annular protrusion and extends from the shaft portion. The protrusion has a surface adapted to contact a top surface of the body to secure the fork to the body. The male bearing area is adapted to contact said female bearing area when the shaft portion is inserted into the female bearing area such that the first and second tapered sections are in contact and the recess section and the annular protrusion section are in contact.

The toy cycle can further include a portion of the shaft being adapted to receive a handlebar. A second protrusion extends from the portion adapted to receive the handlebar. The handlebar has a void 1007 and a recess, the recess is adapted to interact with the second protrusion. The toy can also have handlebar with a void defining a wall. At least one protrusion extends from the wall. The shaft portion has a recess adapted to interact with the at least one protrusion extending from the wall to secure the handlebar to the shaft portion.

The toy can further have a wall with at least one flat surface, and the shaft portion has a section with at least one flat surface. The at least one flat surface of the wall and the at least one flat surface of the shaft portion can interact to rotate the shaft when the handlebar is rotated.

Further, the recess can have a first radial surface 2012 parallel to the first axis. An annular protrusion having a second radial surface 42 is parallel to the second axis. The first and second vertically oriented surfaces are adapted to contact to limit change in an angle of first axis with respect to the second axis. The toy can further have a second recess section in the female bearing area defining the top surface 40. The surface 1008 of the protrusion extending perpendicular to the second axis, and the top surface perpendicular to the first axis.

The toy can further have tabs integrally formed to the fork at a distal end of the fork, the tabs having a flexible portion and a rigid portion, the rigid portion having a first surface. A recess at the distal end of the fork is adapted to receive an axle. The flexible portion is adapted to bend such that the first surface mates with the fork for mounting the axle to the fork while allowing the axle to rotate within the recess. In addition, the surface of said protrusion of the shaft extends perpendicular to the second axis.

The toy can further have a protrusion on the tab and a second recess on the fork, the protrusion on the tab can be inserted into the second recess to align the tab with the fork.

In addition, the toy can have a protrusion on the fork and a recess in the tab. The protrusion inserted into the recess in said tab to align the tab with the fork.

The toy can also have an axle recess in the tab, the axle adapted to rotate within the axle recess.

The toy can also have a blow molded pedal with a bearing surface having a central axis. The pedal has a plurality of ribs each with a curved surface facing the central axis, each curved surface has a radius, the curved surfaces defining the bearing surface. In addition, two side sections 1006 are connected to the plurality of ribs and define two substantially flat surfaces. The bearing surface is adapted to rotate around a first section of the axle.

The pedal can further have the plurality of ribs in alternate orientations with respect the central axis. The pedal can also have a plurality of protrusions extending from each of the first and second surfaces. The protrusions provide traction for the pedal.

The toy cycle has a body and a blow molded fork adapted to secure to the body. Tabs are integrally formed to the fork at a distal end of the fork. The tabs have a flexible portion and a rigid portion, the rigid portion has a first surface. A recess at the distal end of the fork 28 is adapted to receive an axle. The flexible portion is adapted to bend such that the first surface mates with the fork for mounting the axle to the fork while allowing the axle to rotate within the recess.

The toy cycle can further have a blow molded pedal. The pedal has a bearing surface with a central axis. A plurality of ribs each having a curved surface face the central axis, and each curved surface has a radius, the curved surfaces defining the bearing surface. The pedal has two side sections connected to the plurality of ribs and the side sections define two substantially flat surfaces. The bearing surface is adapted to rotate around a first section of the axle. The pedal can further have a proximal end of adapted to receive the first section of the axle. A stop is at a distal end of the pedal, the stop adapted to limit the insertion of the first axle section.

DETAILED DESCRIPTION OF THE INVENTION

Figure 1:
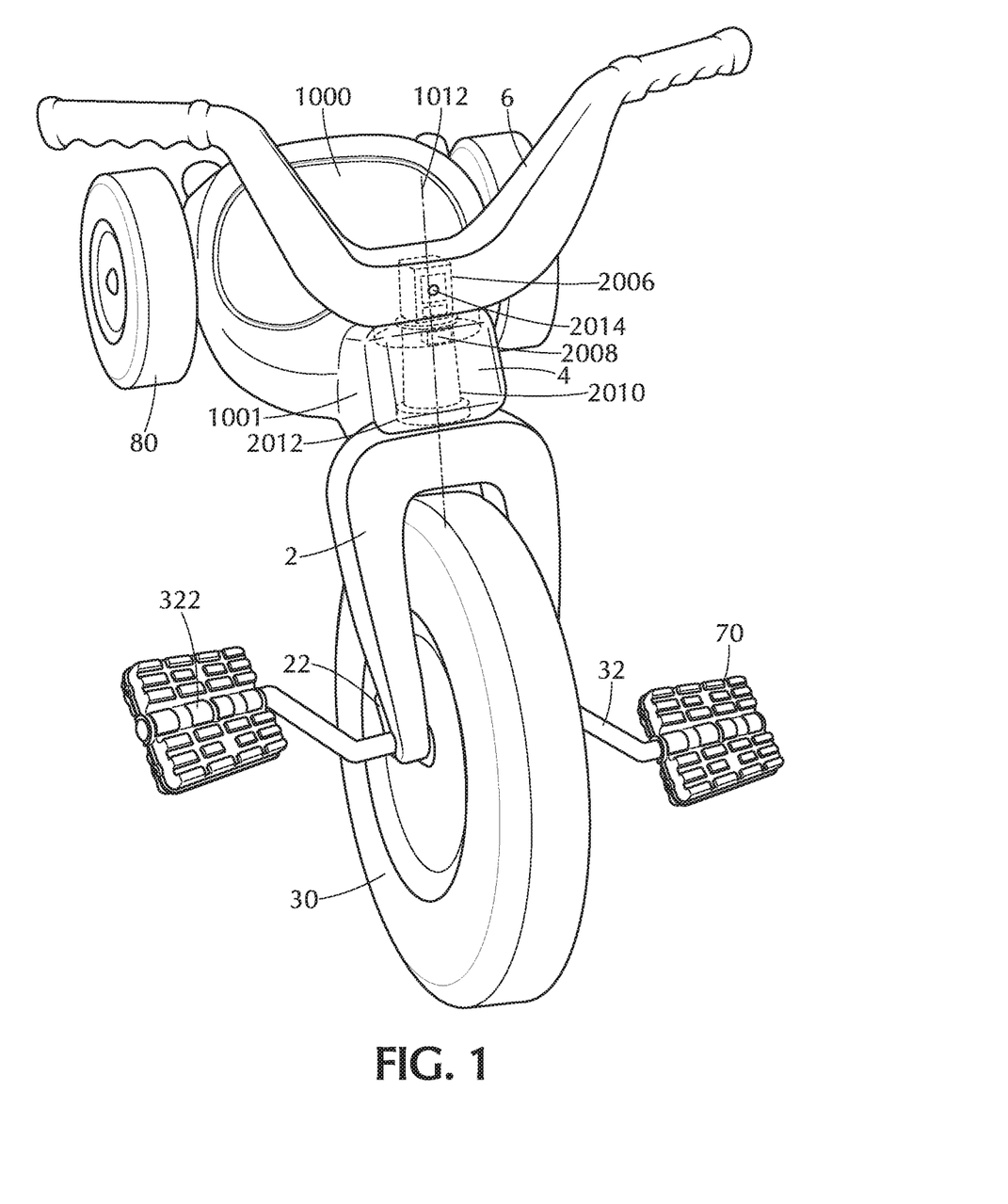
FIG. 1 is a perspective view of the toy cycle of the present invention.

FIG. 1 shows the tricycle of the present invention with a body 4 with a seating surface 4000 and an arm 4002. A fork 2 is inserted into a hole in the arm. An axle 3 is mounted to the fork 2 and a wheel is secured to the axle 3. Each side of the axle has a pedal 70 affixed thereto. The fork 2 has a shaft with bearing surface composed of a tapered section 2010 and a ring 2012. The bearing surface interacts with a corresponding tapered section and recess in the body, which are shown in more detail in FIGS. 6A and 6B. The ring and the recess interact to support the weight of the rider while the tapered section 2010 and the corresponding tapered section in the body interact to prevent wobble between the fork and body.

An axis aligns with the center of the shaft and passes through the wheel axle to define a vertical angle. The tapered section is at an angle that is closer to the vertical angle than a horizontal plane, where the horizontal plane is perpendicular to the axis, for example less than 20 degrees, preferably less than 10 degrees and even more preferably less than 5 degrees but greater than 1 degree. The ring has a first surface 2012 extending between the tapered section and an outer surface of the ring. The outer surface 2112 of the ring being generally vertical in orientation and the first surface extends generally horizontal from the tapered section. The first surface may be generally flat and horizontal or may have a rounded profile. A surface corresponding to the first surface is located within the hole of the body and mates with the first surface to support the weight of the rider. The height of the recess in the hole makes up preferably less than 50% of the total distance between the top and bottom surfaces of the arm. More preferably the height is less than 40% and even more preferably less than 25% of the distance between the top and bottom surfaces of the arm. The distance between the outer surface 2112 and the tapered section is preferably less than 20% of the diameter of the tapered section where the tapered section meets the ring, and more preferably less than 10%.

The outer surface of the ring is generally vertical in order to prevent buckling of the ring in response to a rider's weight, and a corresponding surface in the body may mate with the outer surface of the ring. The tapered section of the shaft allows the shaft to be easily inserted into the body. The tapered section and the surfaces of the ring may move against the corresponding surfaces or sections of the body to allow the fork to rotate. Since the majority of a rider's weight is designed to be supported by the ring, the total contact area is minimized in comparison to prior art tricycles. Without the ring, the tapered section would support the weight of the rider, which would likewise result in increased wear on the tapered section and lead to wobble and potentially catastrophic failure. Since the ring supports the majority of the weight of the rider and the ring has a smaller surface area than the tapered section would, the tricycle has reduced friction or resistance associated with the rotation of the handlebar, and further, more of the wear between the fork and body is localized at the ring. This produces improved handling characteristics of the tricycle both upon initial assembly and over the lifetime of the toy. The first surface is also relatively narrow in comparison to the diameter of the shaft. In other words, the distance between the tapered shaft and the outer surface of the ring is relatively small in comparison to the diameter of the tapered shaft. The outer surface of the ring also interacts with a corresponding surface of the hole in the body. These two surfaces are generally disposed in a vertical orientation, and these two surfaces bear against each other and may rotate against each other. This further reduces the possibility of wobble of the fork.

Between the tapered section and the outer surface of the ring there may be a curved or rounded profile to the surface that supports the majority of the rider's weight. The curved profile can further improve the handling characteristics. The fork has a square section 2006 that connects with a handlebar 6 and allows steering inputs to rotate the fork to steer the tricycle. A hole 2014 allows a bolt to be inserted into the handlebar. The fork and the handlebar may have corresponding protrusions and recesses designed to prevent a user from incorrectly assembling the tricycle. This is shown in more detail by FIGS. 3-5.

Figure 6A:
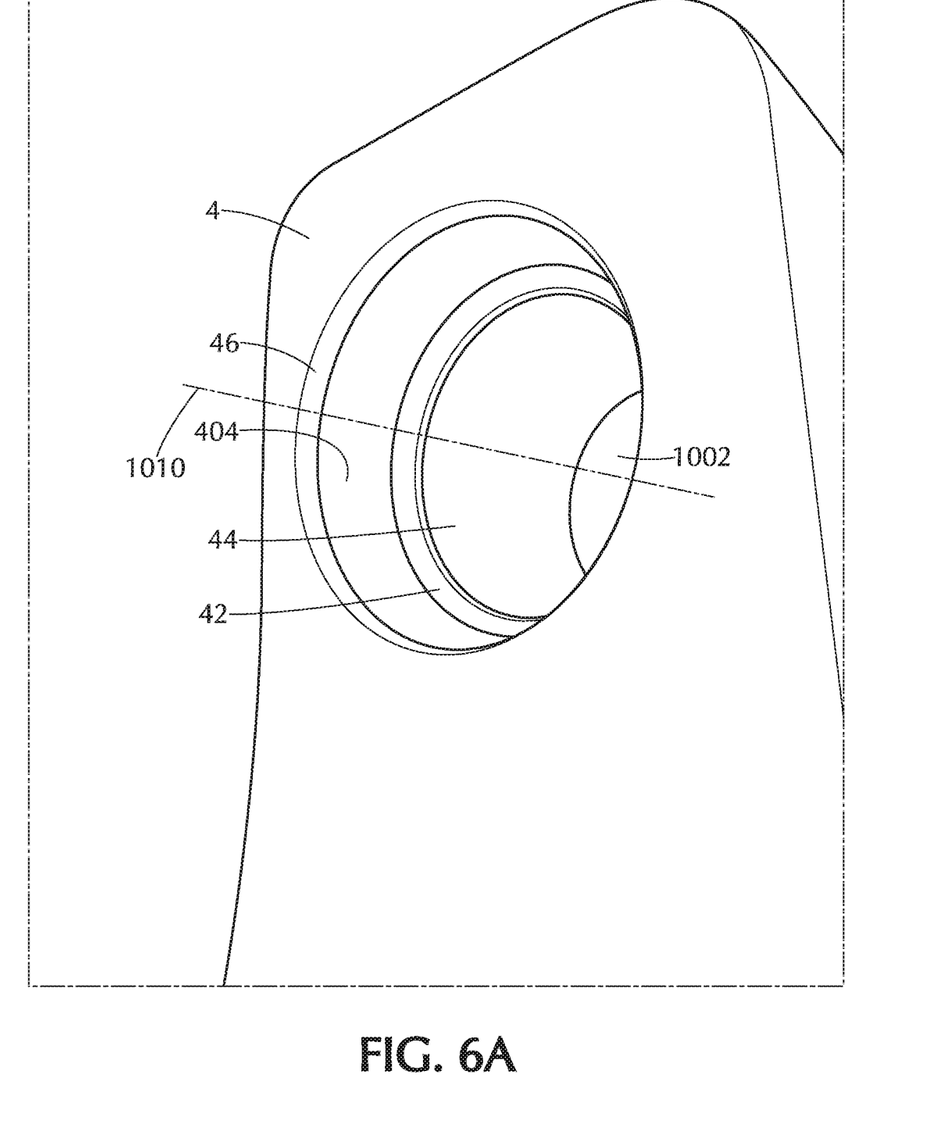
FIGS. 6A and 6B are respectively bottom and top perspective views of the body shown in FIG. 1.
Figure 6B:
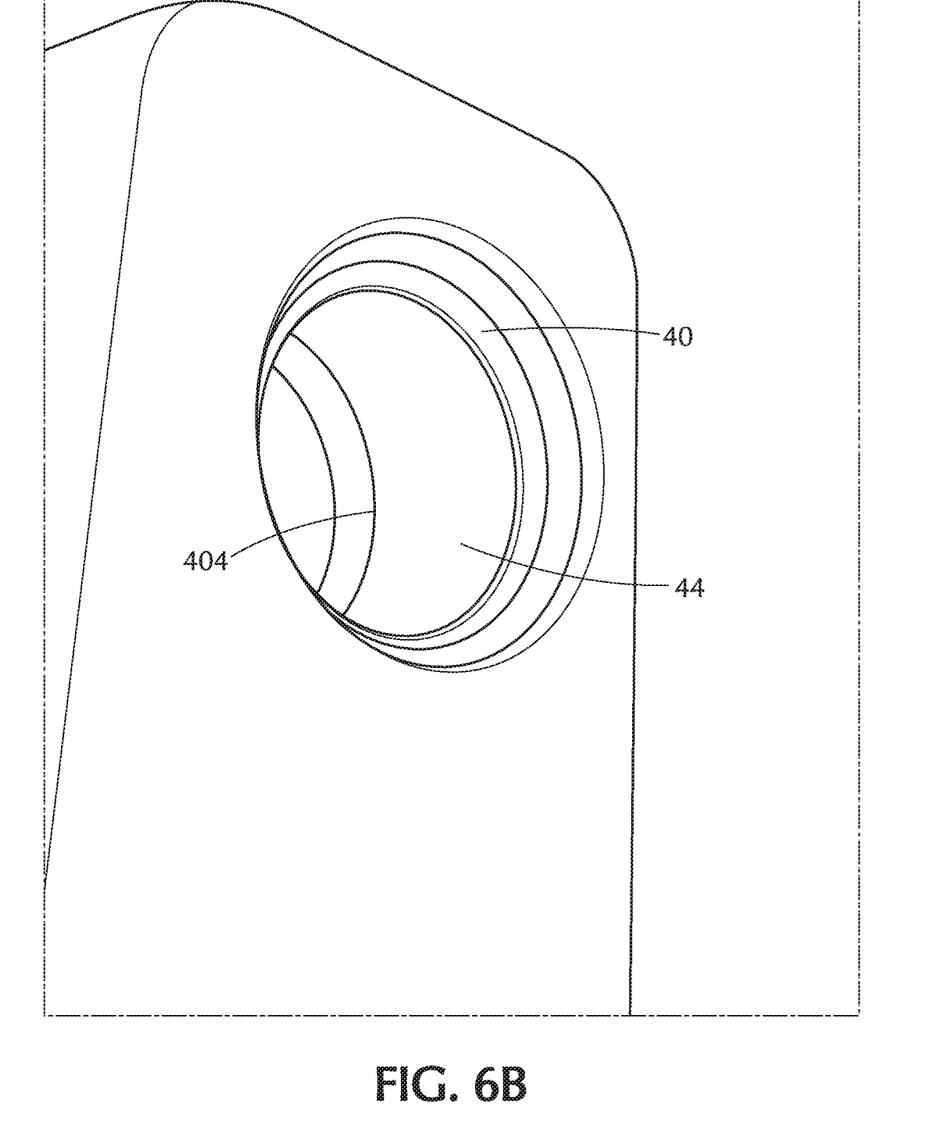

A protrusion 2008 extends from the shaft and interacts with the body to secure the fork to the void in the body while allowing for rotation of the fork. As shown in the figures and more particularly 6A and 6B, the protrusion of the shaft may rotate within a top recess. The top recess may be annular, allowing the shaft to rotate a full 360 degrees within the void of the body. Optionally the top recess and the fork may have a stop that limits rotation to a predetermined degree so that steering inputs prevent the user from turning the front wheel too much, for example so that the front wheel shaft is perpendicular to the rear wheels. The stop would interact with the protrusion to prevent over rotation of the fork.

Figure 2:
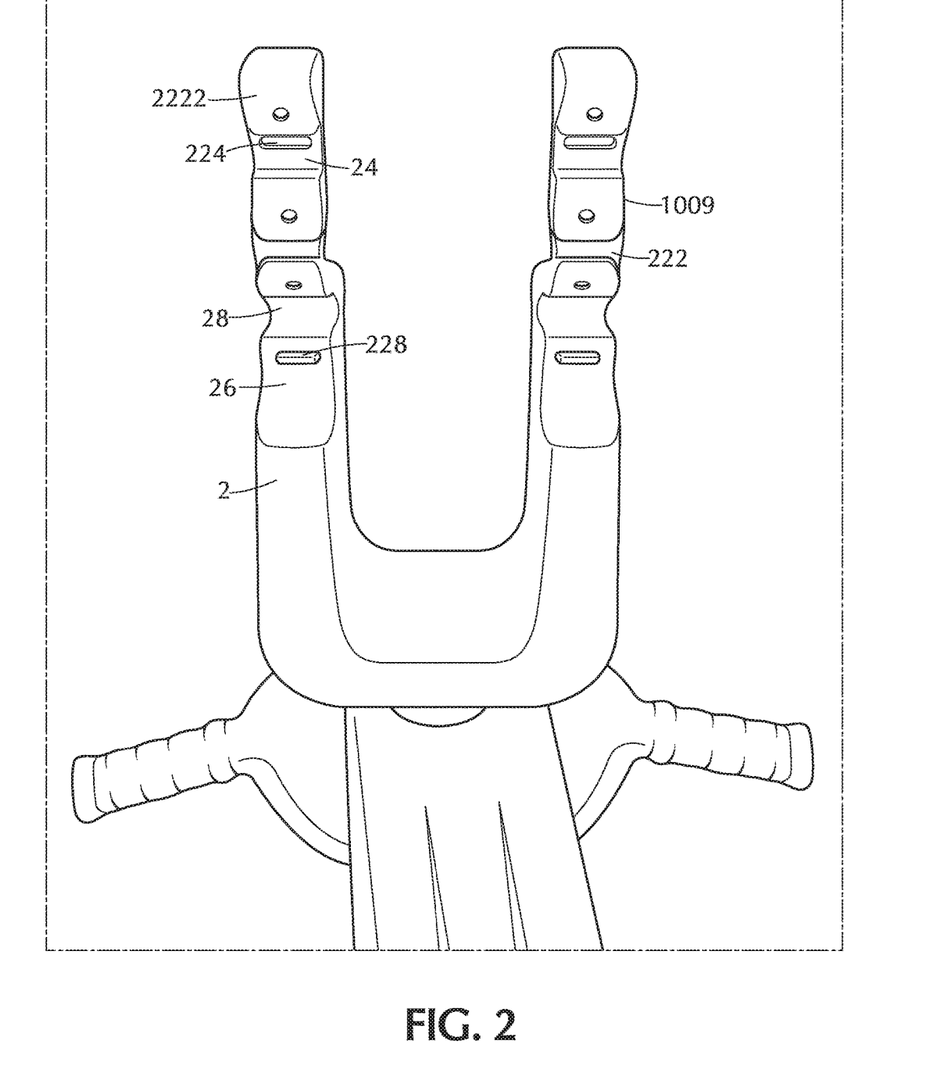
FIG. 2 is detail view of the fork shown in FIG. 1.

As shown in FIG. 1, the fork has a tab 22 that secures an axle 3 having a crank portion 32 and a pedal axle portion 322. As will be shown in FIG. 2, the tab has a flexible portion and a rigid portion. During assembly, the tab is designed to be bent around so that the axle 3 is contained by a recess in the fork and the tab once the tab is secured to the fork. The tab is integrally formed with the blow molded fork. This eliminates the need to create another mold for plastic pieces that attach to the fork to secure the wheel shaft to the fork.

The pedal 70 is attached to the pedal axle portion 322 so that the pedal may rotate around the pedal axle portion 322. The pedal 70 is shown in more detail in FIGS. 9A and 9B.

As discussed above, FIG. 2 shows how the tab 22 and fork 2 are designed to receive the axle 3. The distal end of the fork has the integrally formed tab attached to it with a flexible portion 222 and a rigid portion 1009 having a first surface 2222. When bent around the axle, the flexible portion 222 bends such that the surface 2222 contacts surface 26. As shown in the figure, surface 26 is a recess in the rear of the fork that is shaped as the female counterpart of the tab 22 such that the fork 2 and tab produce a more continuous or smooth surface once assembled. Alternately, the surface 26 may extend from the fork without any recess into the fork such that the tab is raised from the fork once assembled. In order to further aid in assembly, the tab has a recess 224 that interacts with a protrusion 228 located on the fork. This interaction helps align the tab during assembly and to properly align the holes in the tab and fork for easier assembly. A recess in the fork 28 is designed to receive the axle 3 such that the axle rotates within the recess 28 and the recess 28 acts as a bearing surface between the axle 3 and the fork. A corresponding recess 24 may exist in the tab to further provide a bearing surface.

Figure 3:
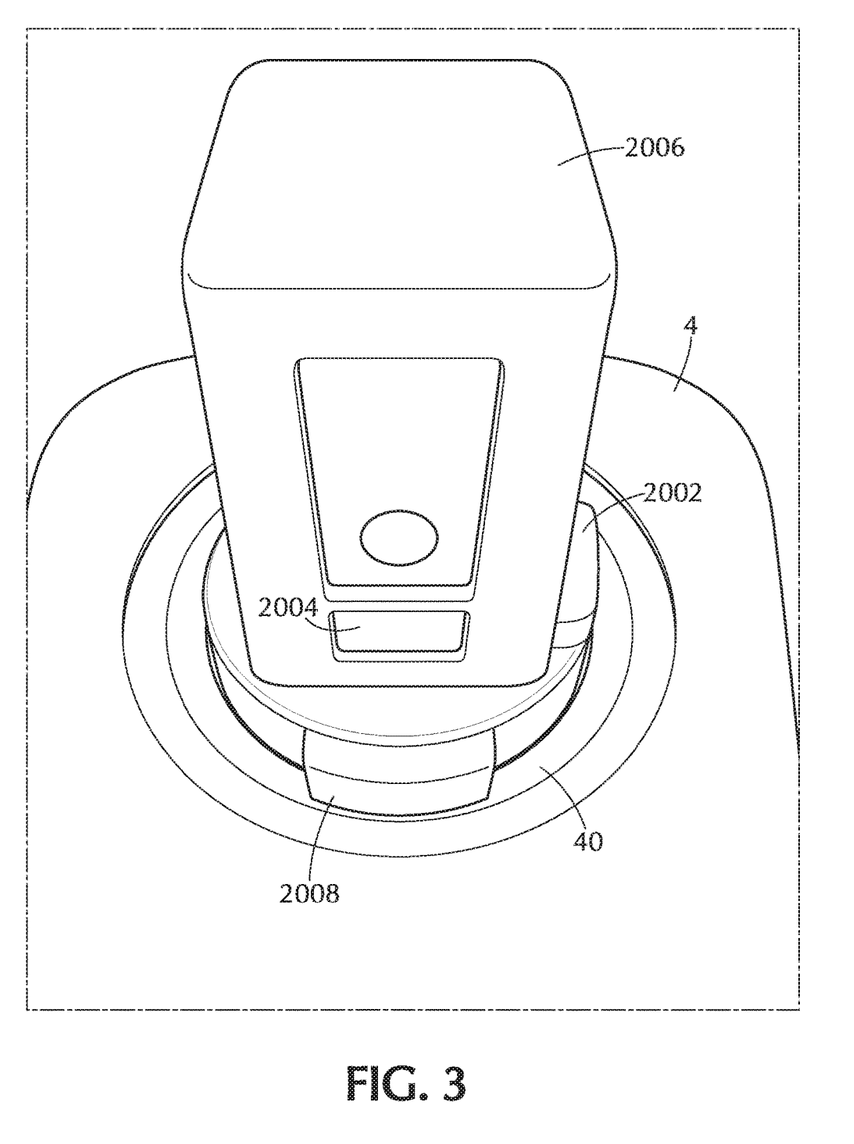
FIG. 3 is a detail view the interaction between the fork and body shown in FIG. 1.

FIG. 3 shows a top view of the body 4 with the fork inserted therein. The protrusion 2008 extends from the shaft and interacts with the body at a recess 40 to provide a locking action that prevents the fork from coming out of the body. One surface of the protrusion is substantially perpendicular to the axis of the shaft that has been described above, and the substantially perpendicular surface interacts with the body to secure the fork to the body. The protrusion 2008 may be designed in a number of lengths to provide more or less permanent locking action. For example, a longer protrusion would result in a more permanent locking action, making it more difficult to pull the fork from the body than if the protrusion were shorter. The body may also be designed without a recess and the protrusion 2008 would then interact with the top surface of the body to provide a locking action. The square portion of the fork extends above the body and is designed to interact with the handlebar. Protrusion 2002 extends from one side of the square section and aligns with a corresponding recess in the handlebar to ensure proper alignment of the handlebar with the fork. Recess 2004 interacts with a clip or protrusion on the handlebar to provide a locking action similar to that of the locking action that secures the fork to the body. The protrusion 2008 can also have a generally triangular cross section, where one edge of the triangle is the substantially horizontal surface, one edge is in alignment with the tapered section of the shaft and the third edge is angled downwards from the tapered section to the distal end of the horizontal surface to aid in insertion of the shaft into the body and further allowing the protrusion to displace during insertion and then spring back so that the horizontal surface of the protrusion interacts with the body to secure the fork to the body. The triangular cross section may further have rounded profiles or edges to reduce the likelihood of plastic deformation during insertion of the shaft into the body.

The proximal end of the fork 2 has a generally square cross section. The corners of the cross section may be rounded to aid in removing the fork from the mold during manufacturing. The square shape of the cross section allows the handlebar to be installed over the fork so that rotation of the handlebar causes rotation of the fork due to the interacting squared shapes. Alternatively, the shape of the cross section could be an oval or another shape that would link the rotation of the handlebar to the rotation of the fork. For example, the fork and handlebar could each have one flat section that would interact to link the rotation of the handlebar to the rotation of the fork. The protrusion 2002 extends from the portion of the shaft with a square cross section. The handlebar has a recess that corresponds to this protrusion such that the protrusion inserts into the recess of the handlebar when the handlebar is installed over the shaft. The design of the protrusion and recess results in a handlebar that can only be assembled in one orientation. The square section of the shaft has a hole in it and the handlebar has a corresponding hole. The two holes align during correct installation such that a bolt can be inserted through the handlebar and shaft to secure the assembly. Because there is one protrusion extending from one side of the shaft and a recess on the corresponding wall of the void in the handlebar, the handlebar can only be installed in one direction. This makes the installation and assembly of the toy cycle more intuitive, because an individual who chooses not to read the assembly directions would only be able to mount the handlebar in the correct orientation.

Figure 4:
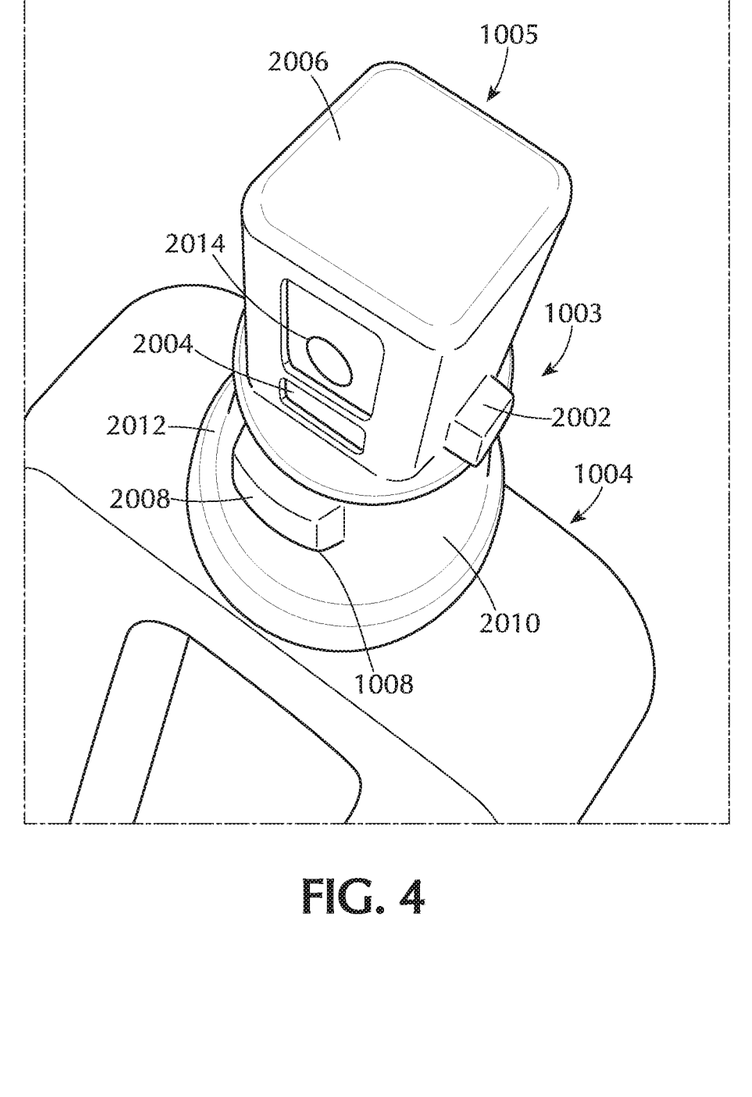
FIG. 4 is a perspective view of the fork shown in FIG. 1.

FIG. 4 shows the fork and more specifically the bearing section of the fork that includes a ring with a surface 2012 for supporting the weight of the rider and a tapered section 2010. The ring and tapered sections interact with the corresponding recess and tapered section in the body. Outer surface 2112 interacts with a corresponding surface of the recess in the body to further reduce wobble.

Figure 5:
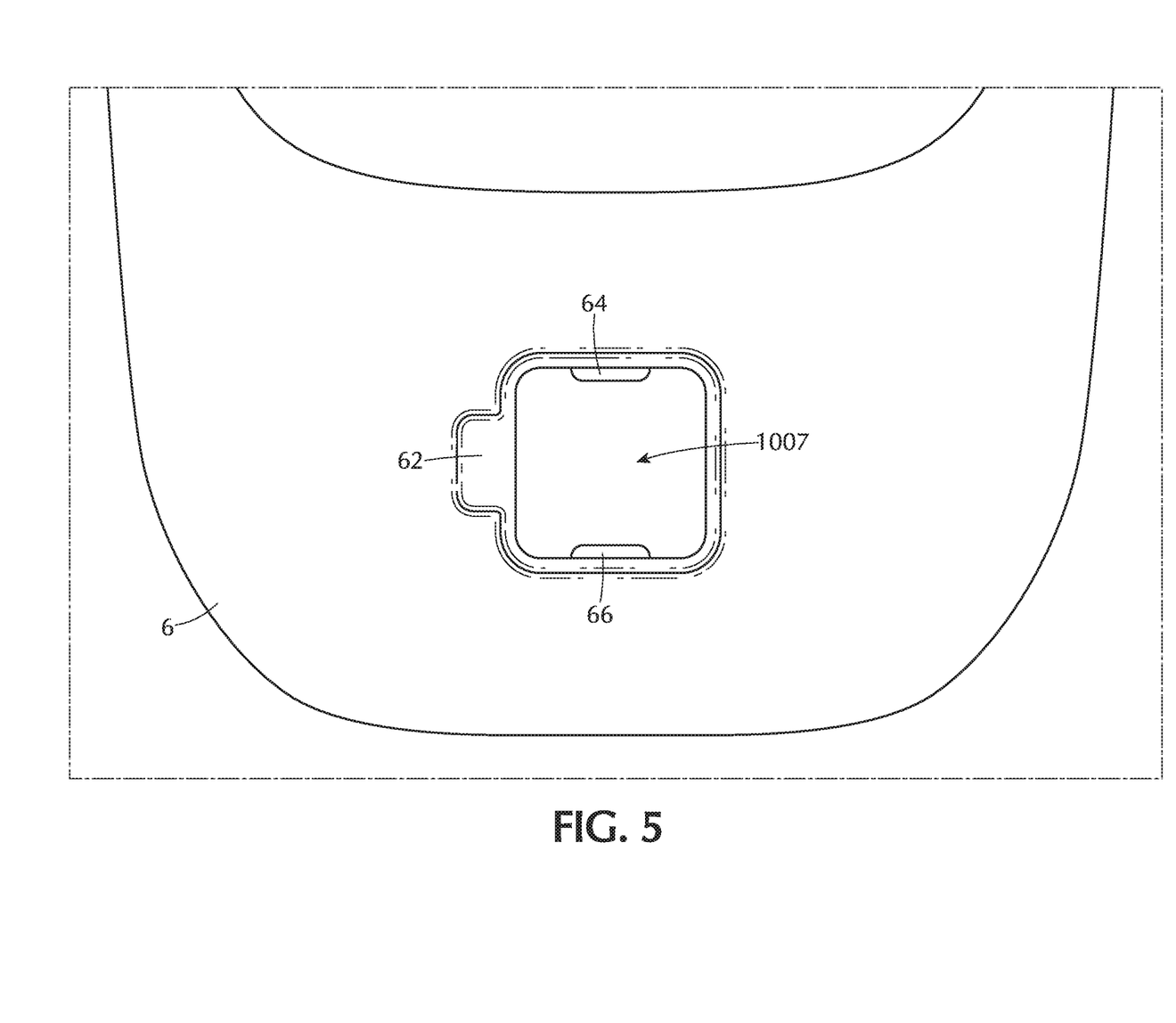
FIG. 5 is a bottom view of the handlebar shown in FIG. 1.

FIG. 5 shows the underside of the handlebar with a recess 62 designed to interact with protrusion 2002 on the fork. The void in the handlebar as shown has a generally square profile that corresponds to the square profile of the shaft. Clips 64 and 66 interact with recess 2004 to provide locking action for the handlebar against the square section of the shaft. The recess 2004 and clips 64 and 66 have generally horizontal surfaces that interact to create this locking action. This locking action for the handlebar enhances the security and durability of the toy. As discussed previously, an individual assembling the toy may not read or pay attention to directions, regardless of how conspicuous the warnings are. This could result in the bolt through the holes in the handlebar and shaft not being installed. The addition of the protrusions that lock against the fork would still result in the handlebar secured to the fork. Further, the protrusions and locking action described would act as a safety backup that would allow the tricycle to still function.

FIG. 6A shows the bottom of the body at the void a recess having surfaces 404 and 42 that interact with the corresponding ring with surface 2012 on the fork to support the rider's weight. Tapered section 44 interacts with the tapered section of the shaft 2010, which reduces wobble between the fork and body.

FIG. 6B shows the top of the body where tapered section 44 meets with recess 40 on the top surface. Recess 40 interacts with the protrusion 2008 on the fork to provide a locking action previously described.

Figure 7:
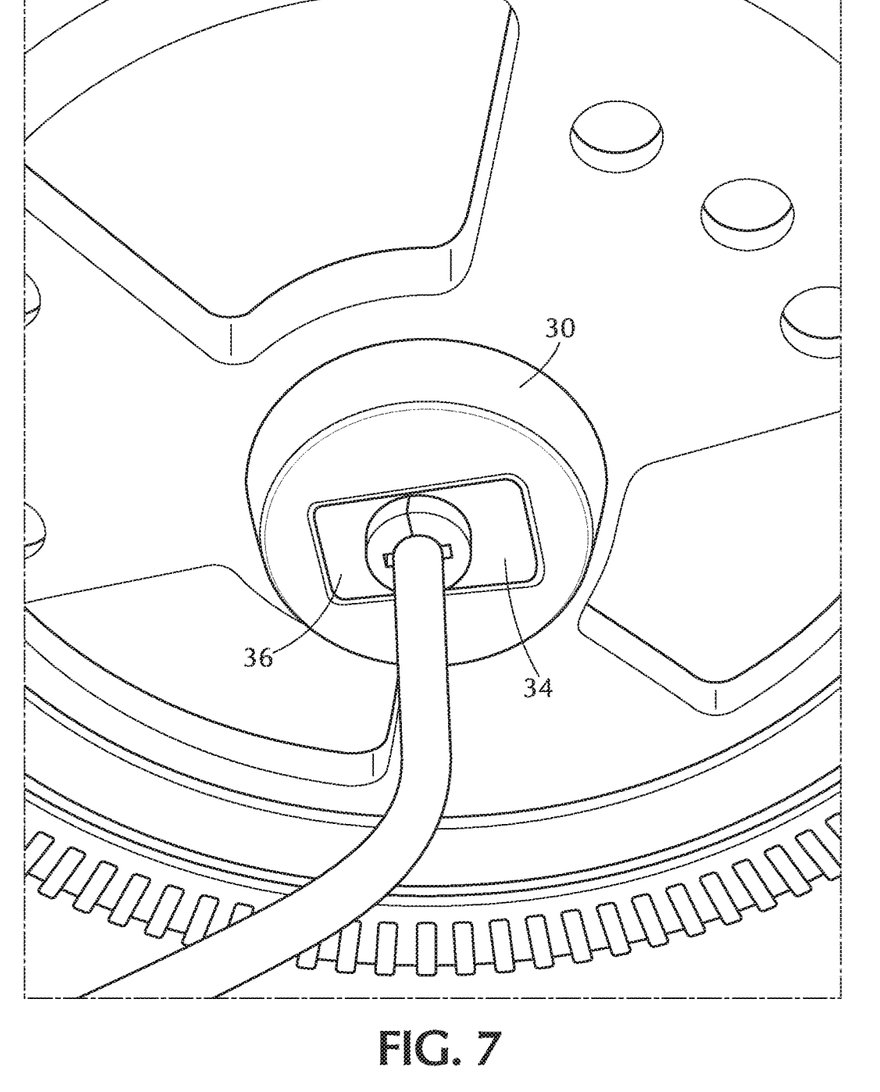
FIG. 7 is a perspective view of the wheel assembly of FIG. 1.
Figure 8:
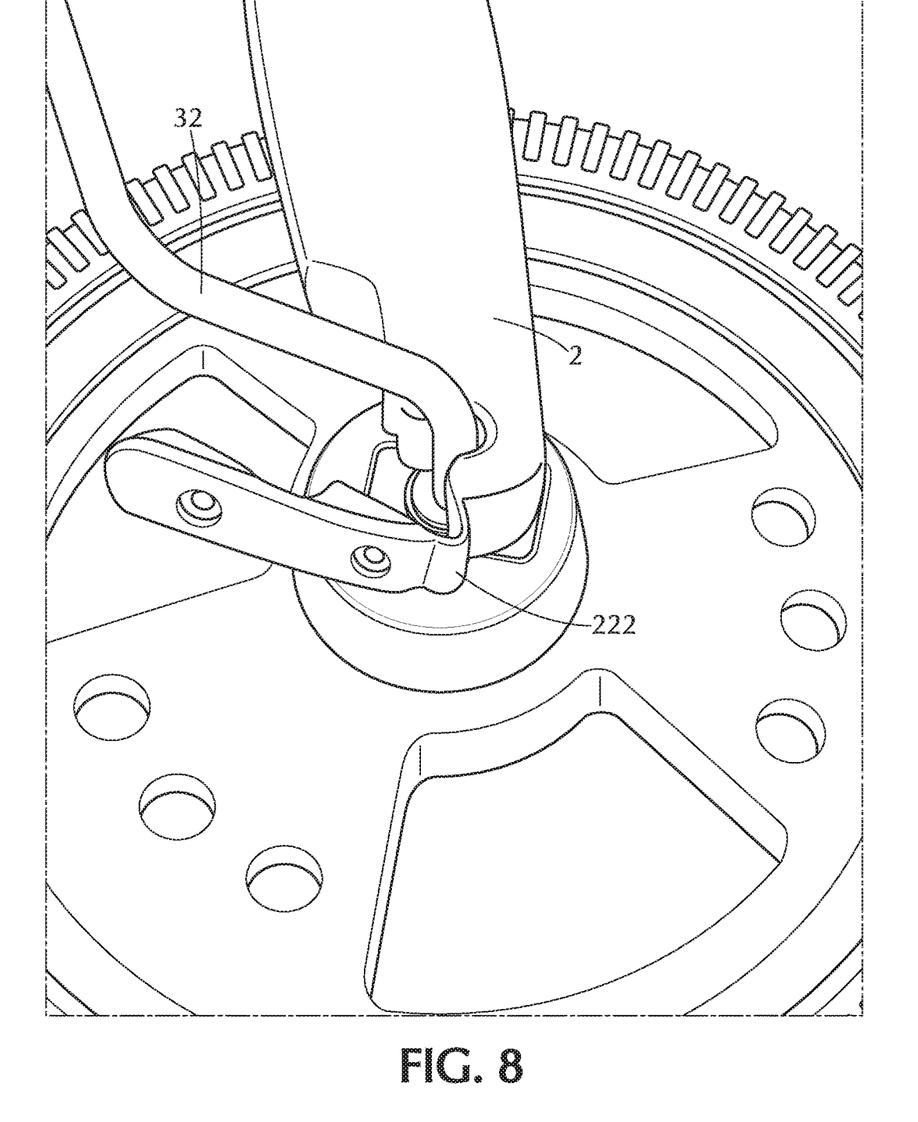
FIG. 8 is a perspective view of the wheel and fork assembly of FIG. 1.

FIG. 7 shows one side of the wheel 30 with two inserts 34 and 36. The inserts have a channel 334 that interacts with a corresponding protrusion on the axle 3. The interaction of the channel and the protrusion of the axle allows for torque transmitted from the pedals to rotate the axle and thereby rotate the wheel 30. The wheel has a recess therein that is shaped to receive the inserts, the recess and likewise the inserts have flat surfaces that interact to transfer a torque generated by the shaft to the wheel. Because the axle is formed from a round bar and has a number of bends and the wheel has a thickness, the recess in the wheel is larger than the diameter of the round bar so that the various angles and bends of the axle may be inserted through the wheel. Once the axle is inserted into the recess of the wheel, the inserts are placed within either side of the wheel. The recess of the wheel has an internal surface that interacts with the two inserts to prevent insertion of the inserts all the way through the wheel. Likewise, the other side of the wheel also receives another two inserts. FIG. 8 shows the wheel during assembly with the fork. Screws can insert into the holes in the tab to secure the tab on either side of the axle.

Figure 9A:
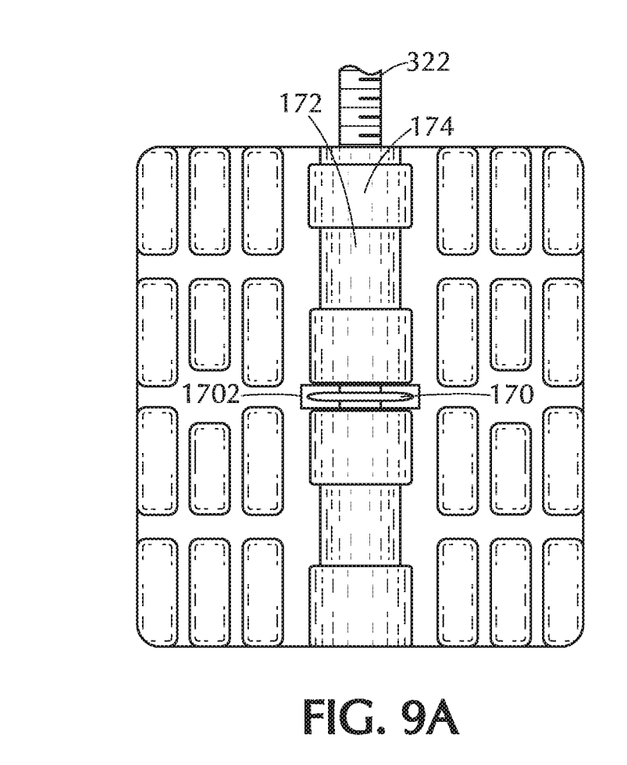
FIGS. 9A and 9B are top and perspective views of the pedal shown in FIG. 1.
Figure 9B:
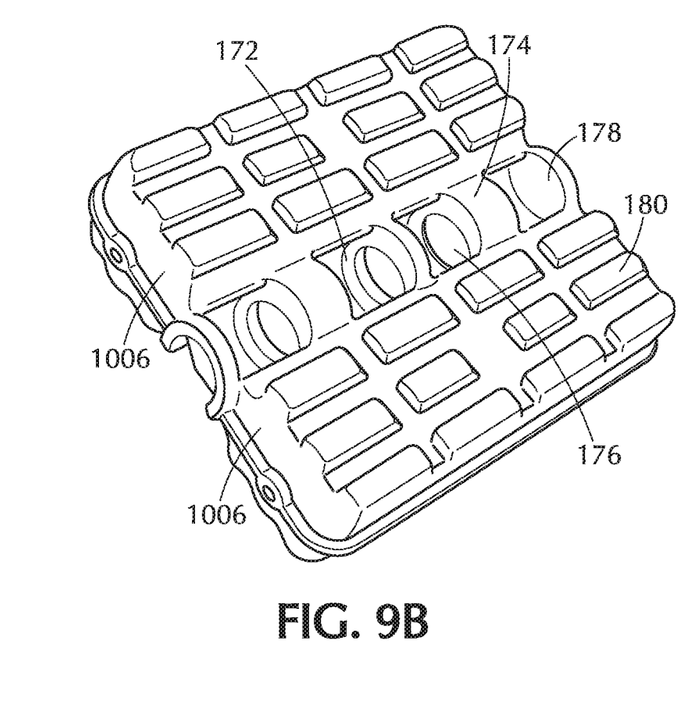

FIGS. 9A and 9B show the pedal previously shown in FIG. 1. The pedal is blow molded and has two sides with a series of ribs 174 between the sides. The sides are generally hollow due to the blow molding process, and the ribs are integrally formed between the two sides. The sides may be formed as a double wall blow molded part. Each of the pedal sides has a series of protrusions designed to provide traction against a user's foot. As shown, the protrusions are rectangular in shape, however other patterns are contemplated. The two sides form two surfaces where the user's foot is designed to interact with one of the surfaces during use. Each of the ribs has a curved surface. The orientation of the ribs alternate with respect to the central axis to form a bearing area that surrounds the central axis and is designed to interact with a section of the axle that is designed to receive the pedal. The ribs can also have a varying thickness so that the ribs keep the center axis of the pedal aligned with the section of the axle designed to receive the pedal, even when under a load that is off center relative to the pedal. For example, the ribs at the proximal and distal ends of the pedal may be relatively narrow with the curved surface oriented in the same direction for both the proximal and distal ribs. Between the proximal and distal ribs may be a wider rib that has the curved surface oriented in the opposite direction relative to the proximal and distal ribs. This orientation of the ribs would provide for a pedal that would stay aligned with the axle if a pedaling force were applied in a non-symmetrical manner in relation to the center between the proximal and distal ends. For example, if a pedaling force was located near the distal rib, the pedal would be inclined to rotate about an axis perpendicular to the central axis of the pedal and parallel to the two surfaces. The narrow ribs at the ends would resist this rotation by bearing against the pedal shaft. FIGS. 9A and 9B show a pedal with more than three ribs that alternate in orientation with respect to the central axis. For example, a pedal with three ribs described previously may be placed in an orientation where two of the ribs located on the proximal and distal ends have one orientation, and a rib located between the two ribs on the proximal and distal ends would have the opposite orientation, ie 180 degrees relative to the two ribs at proximal and distal ends. As discussed, the alternation of the ribs and likewise the curved surface forms a bearing area 172 such that each internal curved surface makes up a part of the bearing area that receives a pedal shaft, where the pedal shaft rotates within and against the bearing area. During the blow molding process a thin section of plastic 176 may be left between the ribs, but during assembly, this thin section can be pierced by the pedal shaft portion 322. Two of the ribs on the pedal are spaced close together to create a pocket 1702 that receives a washer 170 that secures the pedal to the shaft 322. The internal curved surface of the pocket has a larger diameter than that of the ribs, because the diameter of the washer is larger than that of the pedal shaft, thus the washer must sit in the recess so that the center of the washer aligns with the center of the pedal shaft. One end of the pedal has a thicker section of plastic that acts as a stop 178 to limit the insertion of the shaft 322 inside the bearing area 172. Therefore, during installation, the pedal shaft is inserted through and pierces the thin sections 176, but does not pierce the stop 178.

Figure 10:
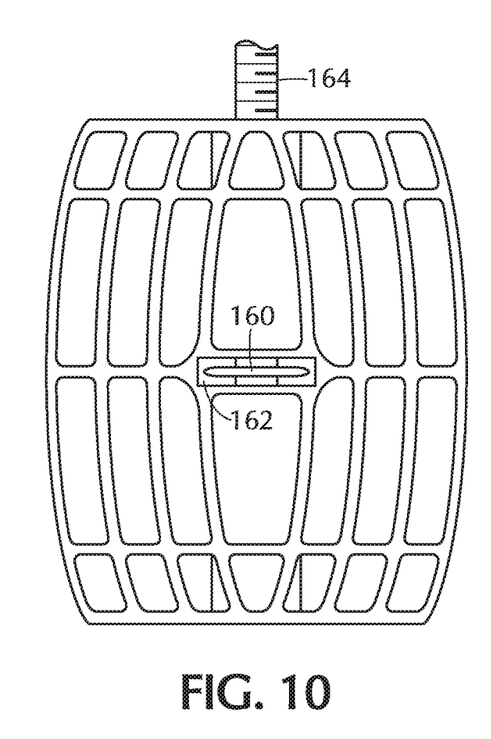
FIG. 10 is a prior art pedal.

FIG. 10 shows a prior art injection molded pedal. As shown, a center section of the pedal has a hole 162 for receiving a washer 160. The center section receives a shaft 164. The injection molded pedal has a plurality of sections that are generally parallel to the central axis and provide traction for a user. Because the injection molded pedal has a number of these sections, the mold must be designed so that enough plastic and molding time is used to ensure that plastic is properly distributed among all of the sections to create a complete pedal. Defects could occur in the sections during the manufacturing process, and the extended molding time can increase costs of manufacture.

What is claimed is:

1. A blow molded toy cycle comprising:
   a body having a seating surface and an arm;
   said arm having a hole with a first axis, said hole defining a female bearing area with a first tapered section and a first recess section, a taper of said first tapered section having an angle with respect to said first axis;
   a fork having a shaft portion at a proximal end, said shaft portion having a second axis passing through a center of said shaft portion;

a male bearing area located on said shaft portion, said male bearing area having a second tapered section and an annular protrusion section;

at least one protrusion molded in said fork and spaced at a distance from said annular protrusion section and extending from said shaft portion, said protrusion having a surface adapted to contact a top surface of said body to secure said fork to said body;

said male bearing area adapted to contact said female bearing area when said shaft portion is inserted into said female bearing area such that said first and second tapered sections are in contact and said annular protrusion section is disposed within said first recess section.

2. The device of claim 1 wherein both the angle of the taper of said first tapered section is in the range of 1 to 10 degrees and an angle of a taper of the second tapered section is in the range of 1 to 10 degrees in relation to said second axis.

3. The device of claim 1 further comprising:
a portion of said shaft adapted to receive a handlebar;
a second protrusion extending from said portion adapted to receive said handlebar;
said handlebar having a void and a recess, said recess adapted to interact with said second protrusion.

4. The device of claim 1 further comprising:
a handlebar having a void and a wall;
at least one protrusion extending from said wall into said void;
said shaft portion having a recess adapted to interact with said at least one protrusion extending from said wall to secure said handlebar to said shaft portion.

5. The device of claim 4 further comprising:
said wall having at least one flat surface
said shaft portion having a section with at least one flat surface.

6. The device of claim 5 wherein said at least one flat surface of said wall and said at least one flat surface of said shaft portion interact to rotate the shaft when the handlebar is rotated.

7. The device of claim 1 further comprising:
a first radial surface parallel to said first axis positioned within said first recess section;
said annular protrusion section having a second radial surface parallel to said second axis;
said first and second radial surfaces adapted to contact to limit change in an angle of first axis with respect to said second axis.

8. The device of claim 1 further comprising:
a second recess section in said female bearing area defining a top surface;
said surface of said protrusion extending perpendicular to said second axis and said top surface perpendicular to said first axis.

9. A blow molded toy cycle comprising:
a body having a seating surface and an arm;
said arm having a hole with a first axis, said hole defining a female bearing area with a first tapered section and a first recess section;
a fork having a shaft portion at a proximal end, said shaft portion having a second axis passing through a center of said shaft portion;
a male bearing area located on said shaft portion, said male bearing area having a second tapered section and an annular protrusion section;
at least one protrusion spaced at a distance from said annular protrusion section and extending from said shaft portion, said protrusion having a surface adapted to contact a top surface of said body to secure said fork to said body;

said male bearing area adapted to contact said female bearing area when said shaft portion is inserted into said female bearing area such that said first and second tapered sections are in contact and said annular protrusion section is disposed within said recess section;

tabs integrally formed to said fork at a distal end of said fork, said tabs having a flexible portion and a rigid portion, said rigid portion having a first surface;

a recess at said distal end of said fork adapted to receive an axle;

said flexible portion adapted to bend such that said first surface mates with said fork for mounting said axle to said fork while allowing said axle to rotate within said recess.

10. The device of claim 1 wherein said surface of said protrusion of said shaft extends perpendicular to said second axis.

11. The device of claim 9 further comprising a protrusion on said tab and a second recess on said fork, said protrusion on said tab inserted into said second recess to align said tab with said fork.

12. The device of claim 9 further comprising a protrusion on said fork and a recess in said tab, said protrusion on said fork inserted into said recess in said tab to align said tab with said fork.

13. The device of claim 9 further comprising an axle recess in said tab, said axle adapted to rotate within said axle recess.

14. The device of claim 1 further comprising:
a blow molded pedal comprising:
a bearing surface having a central axis;
a plurality of ribs each having a curved surface facing said central axis, each curved surface having a radius, said curved surfaces defining said bearing surface;
two side sections connected to said plurality of ribs and defining two substantially flat surfaces;
said bearing surface adapted to rotate around a first section of said axle.

15. A blow molded toy cycle having an axle, the toy cycle comprising:
a body;
a blow molded fork adapted to secure to said body;
tabs integrally formed to said fork at a distal end of said fork, said tabs having a flexible portion and a rigid portion, said rigid portion having a first surface;
a recess at said distal end of said fork adapted to receive the axle;
said flexible portion adapted to bend such that said first surface mates with said fork for mounting the axle to said fork while allowing the axle to rotate within said recess.

16. The device of claim 15 further comprising:
a blow molded pedal comprising:
a bearing surface having a central axis;
a plurality of ribs each having a curved surface facing said central axis, each curved surface having a radius, said curved surfaces defining said bearing surface;
two side sections connected to said plurality of ribs and defining two substantially flat surfaces;
said bearing surface adapted to rotate around the axle.

17. The device of claim 16 wherein said blow molded pedal further comprises:

a proximal end of said pedal adapted to receive said first section of the axle;

a stop at a distal end of said pedal, said stop adapted to limit the insertion of the axle.

18. A blow molded toy cycle comprising:

a body having a seating surface and an arm, said arm having a hole therein;

a fork having a shaft portion at a proximal end, the shaft portion configured to be inserted into said hole;

tabs integrally formed to said fork at a distal end of said fork, said tabs having a flexible portion and a rigid portion, said rigid portion having a first surface, said flexible portion configured to bend such that said first surface contacts the fork to mount an axle between said fork and said tabs.

19. The toy cycle of claim 18 further comprising:

two screws configured to secure each tab to said fork when said flexible portion is bent, wherein said axle is positioned between said two screws when said two screws are installed.

20. The toy cycle of claim 19 further comprising holes in said tabs configured to receive said two screws therethrough.

21. The toy cycle of claim 18 further comprising:

a female bearing area with a first tapered section and a first recess section positioned within said hole in said arm;

a male bearing area located on said shaft portion, said male bearing area having a second tapered section and an annular protrusion section;

at least one protrusion spaced at a distance from said annular protrusion section and extending from said shaft portion, said protrusion having a surface adapted to contact a top surface of said body to secure said fork to said body;

said male bearing area adapted to contact said female bearing area when said shaft portion is inserted into said female bearing area such that said first and second tapered sections are in contact and a surface defined by said recess section and said annular protrusion section are in contact.

22. The toy cycle of claim 18 further comprising:

a blow molded pedal configured to secure to the axle, said blow molded pedal comprising:

a bearing surface having a central axis;

a plurality of ribs each having a curved surface facing said central axis, each curved surface having a radius, said curved surfaces defining said bearing surface;

two side sections connected to said plurality of ribs and defining two substantially flat surfaces;

said bearing surface adapted to directly contact and rotate around the axle.

* * * * *